(12) United States Patent
Perigo et al.

(10) Patent No.: US 10,513,164 B2
(45) Date of Patent: Dec. 24, 2019

(54) HVAC CASE FASTENER

(71) Applicants: DENSO International America, Inc., Southfield, MI (US); DENSO CORPORATION, Kariya-shi, Aichi-ken (JP)

(72) Inventors: Ross Perigo, Berkley, MI (US); Carl Williams, Pataskala (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 350 days.

(21) Appl. No.: 15/428,587

(22) Filed: Feb. 9, 2017

(65) Prior Publication Data

US 2018/0222280 A1 Aug. 9, 2018

(51) Int. Cl.
*B60H 1/00* (2006.01)

(52) U.S. Cl.
CPC ................ *B60H 1/00528* (2013.01)

(58) Field of Classification Search
CPC .. B60H 1/00528; F16B 5/0635; F16B 5/0621; F16B 5/0607; F16B 5/06; F16B 5/0642; F16B 5/0664; F16B 2005/0678
See application file for complete search history.

(56) References Cited

U.S. PATENT DOCUMENTS

| 4,582,443 A | 4/1986 | Hegele |
| 4,924,561 A * | 5/1990 | Yoneyama ............ F16B 5/0642 24/297 |
| 5,040,032 A | 8/1991 | Kapon |
| 5,346,347 A | 9/1994 | Barikosky et al. |
| 5,667,395 A | 9/1997 | Okada et al. |
| 5,699,601 A | 12/1997 | Gilliam et al. |
| 5,947,631 A * | 9/1999 | Hironaka ............... F16B 21/06 24/297 |
| 6,042,296 A * | 3/2000 | Wittig .................. F16B 5/0642 24/297 |
| 6,196,755 B1 * | 3/2001 | Okorocha ............. G02B 7/021 403/313 |
| 6,484,755 B1 | 11/2002 | Schwarz |
| 6,727,612 B1 | 4/2004 | Hull et al. |
| 6,789,607 B1 | 9/2004 | Jun et al. |
| 6,942,255 B2 | 9/2005 | Pickering |
| 7,775,451 B2 | 8/2010 | Leoni |
| 8,040,032 B2 | 10/2011 | Kovacs |

(Continued)

FOREIGN PATENT DOCUMENTS

| DE | 102005049801 A1 * | 4/2007 | ............ F16B 5/0642 |
| EP | 1277605 A1 | 1/2003 | |

(Continued)

*Primary Examiner* — Matthieu F Setliff

(74) *Attorney, Agent, or Firm* — Harness, Dickey & Pierce, P.L.C.

(57) ABSTRACT

A heating, ventilation, and air conditioning (HVAC) case for an HVAC assembly. The HVAC case includes a fastener for coupling a first portion of the HVAC case to a second portion of the HVAC case. A clip of the fastener is included with the first portion of the HVAC case. A retention member of the fastener is included with the second portion of the HVAC case. Cooperation between the clip and the retention member couples the first portion of the HVAC case and the second portion of the HVAC case together.

11 Claims, 5 Drawing Sheets

(56) References Cited

U.S. PATENT DOCUMENTS

| | | |
|---|---|---|
| 8,601,649 B2 | 12/2013 | Klein et al. |
| 8,943,655 B2 * | 2/2015 | Kabeya ............... B60R 11/0217 24/453 |
| 2011/0017742 A1 | 1/2011 | Sausen et al. |
| 2012/0146326 A1 | 6/2012 | Williams et al. |

FOREIGN PATENT DOCUMENTS

| | | | |
|---|---|---|---|
| EP | 2463569 A1 | 6/2012 | |
| JP | 2007134294 A | 5/2007 | |
| JP | 2009298292 A * | 12/2009 | ......... B60H 1/00528 |

* cited by examiner

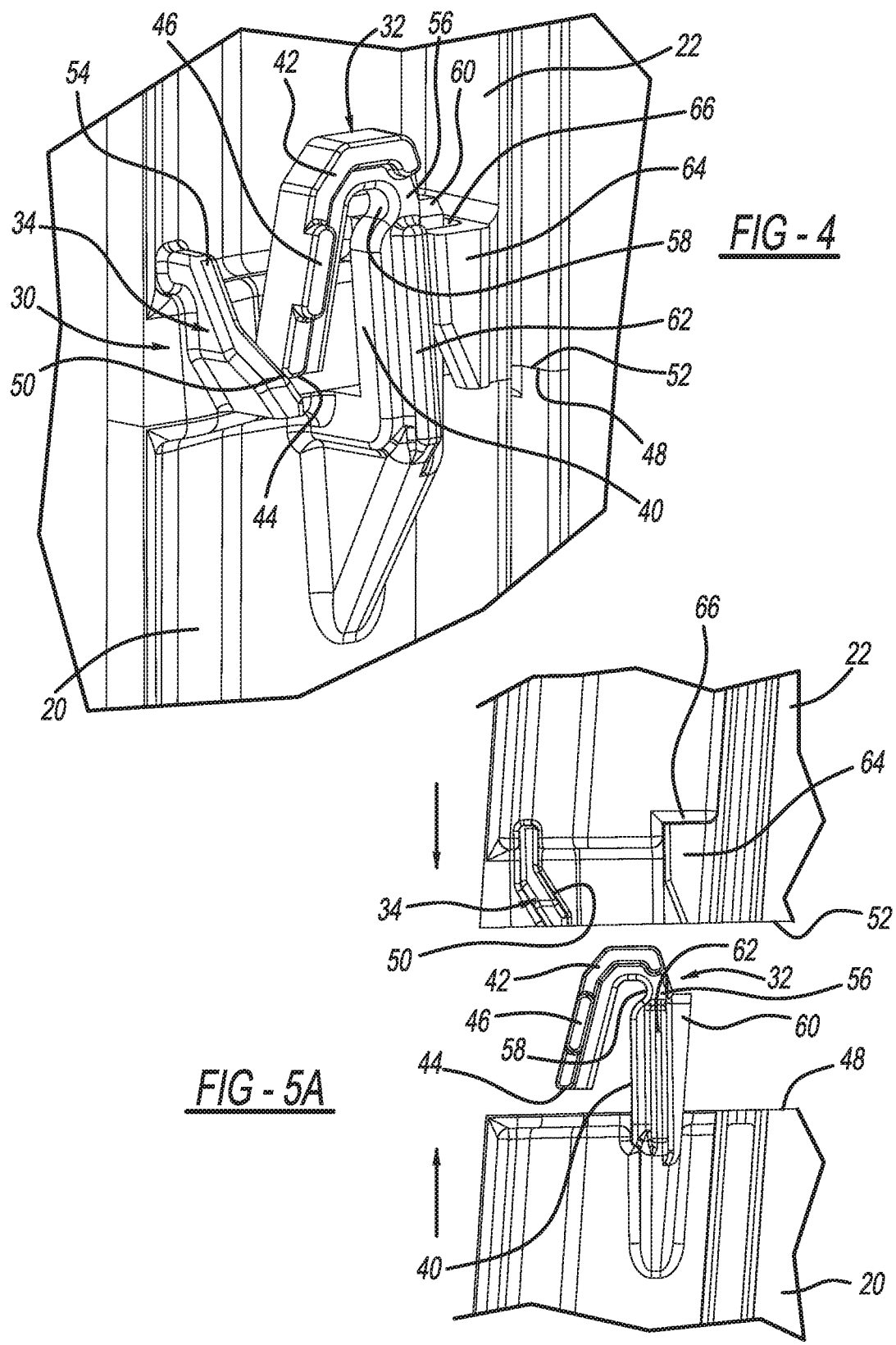

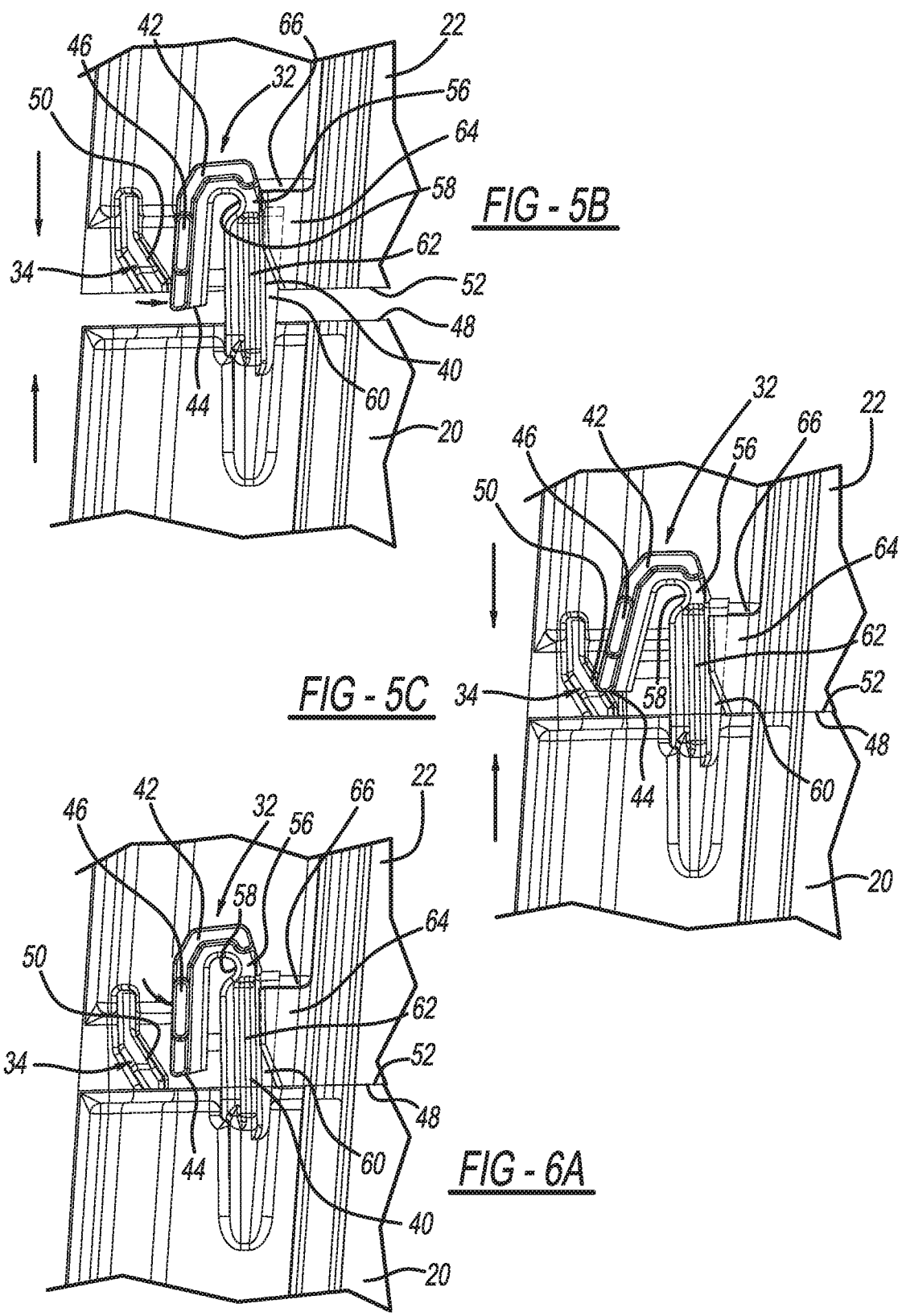

HVAC CASE FASTENER

FIELD

The present disclosure relates to a fastener for a heating, ventilation, and air conditioning case.

BACKGROUND

This section provides background information related to the present disclosure, which is not necessarily prior art.

Heating, ventilation, and air conditioning (HVAC) assemblies often include an HVAC case, which typically houses a heater core and an evaporator. First and second portions of the HVAC case are coupled together with a fastener. While current fasteners are suitable for their intended use, they are subject to improvement. For example, current fasteners are large and protrude a great distance from the HVAC case, thereby making it difficult to accommodate existing fasteners in the areas of newer automobiles designated to receive the HVAC assembly. Furthermore, current fasteners are not self-tuning. In other words, current fasteners cannot automatically adjust to securely couple the first and second portions of the HVAC case together, and thus must be adjusted and customized for the particular HVAC case. The present teachings advantageously provide for an improved fastener for an HVAC case that addresses the shortcomings of current fasteners, and provides numerous additional advantages as one skilled in the art will recognize.

SUMMARY

This section provides a general summary of the disclosure, and is not a comprehensive disclosure of its full scope or all of its features.

The present teachings include a fastener for a heating, ventilation, and air conditioning (HVAC) case. The fastener couples a first portion of the HVAC case to a second portion of the HVAC case. A clip of the fastener is included with the first portion of the HVAC case. A retention member of the fastener is included with the second portion of the HVAC case. Cooperation between the clip and the retention member couples the first portion of the HVAC case and the second portion of the HVAC case together.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 4 is a perspective view of the fastener of FIGS. 2 and 3A;

FIG. 5A illustrates the fastener of FIGS. 2, 3A, and 4 in a decoupled arrangement such that first and second portions of the HVAC case are not coupled together;

FIG. 5B illustrates the fastener in an intermediate position in which a clip of the fastener is depressed inward to a compressed position as the first and second portions of the HVAC case are being coupled together;

FIG. 5C illustrates the fastener in a relaxed/expanded position and coupling the first and second portions of the HVAC case together;

FIG. 6A illustrates the clip of the fastener depressed to the compressed position to allow the first and second portions of the HVAC case to be decoupled;

Corresponding reference numerals indicate corresponding parts throughout the several views of the drawings.

DETAILED DESCRIPTION

Example embodiments will now be described more fully with reference to the accompanying drawings.

Figure 1:
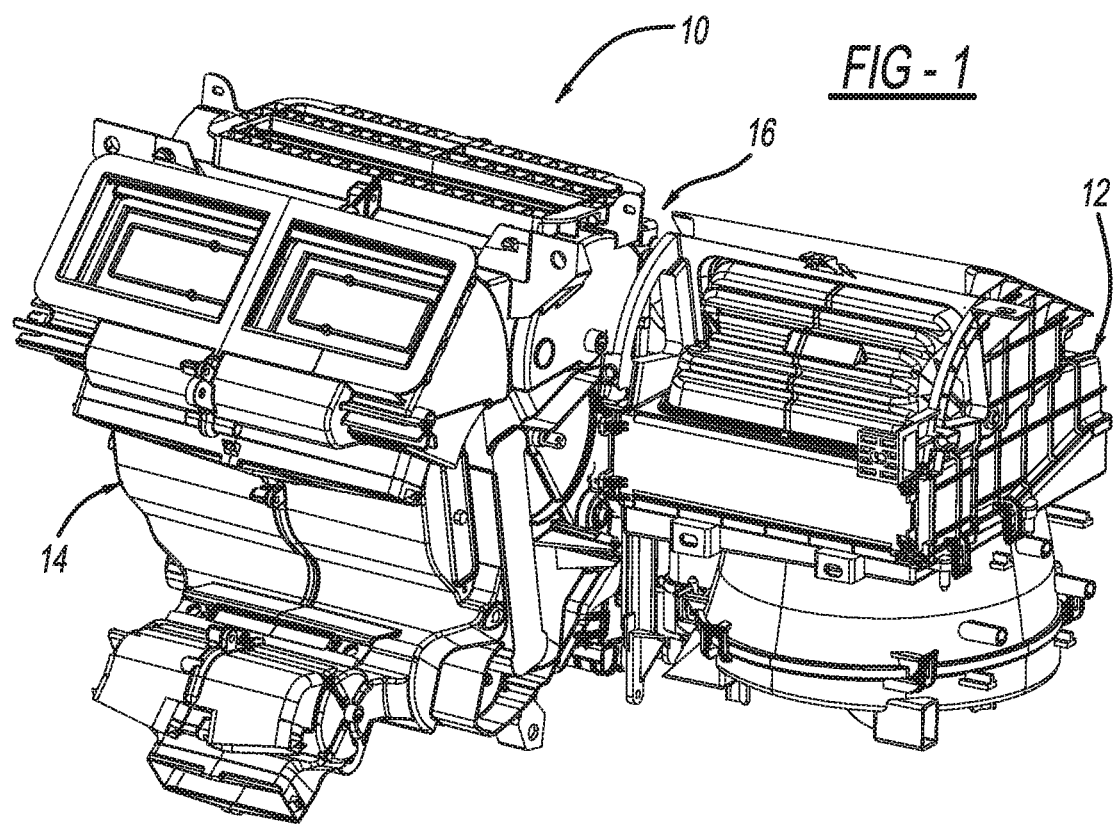
FIG. 1 is a perspective view of a heating, ventilation, and air conditioning (HVAC) assembly.
Figure 2:
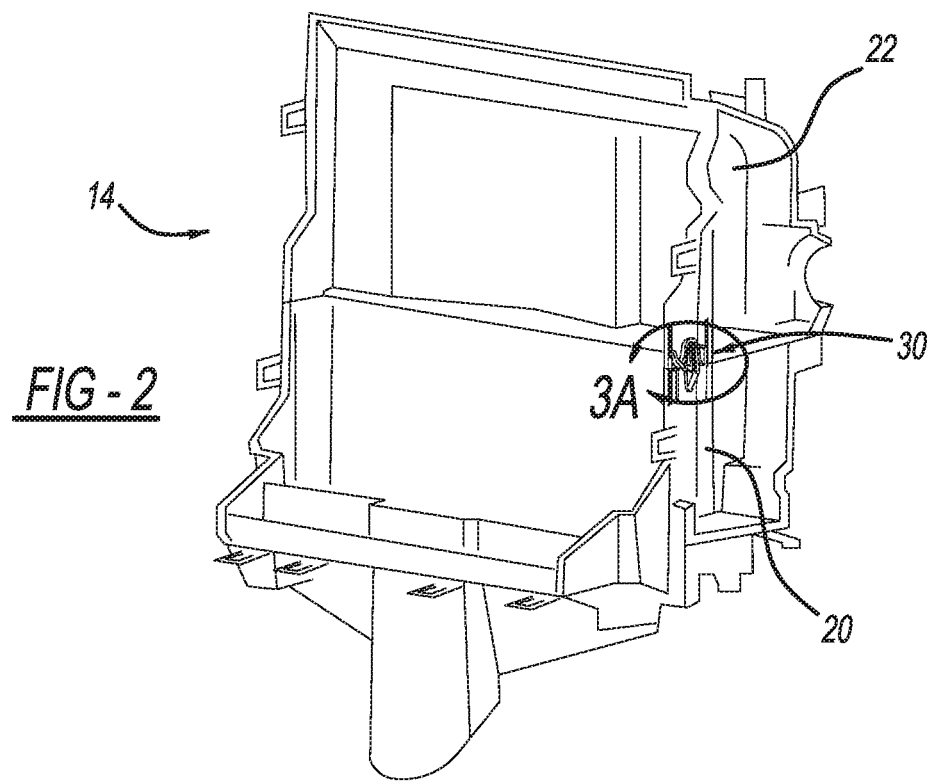
FIG. 2 illustrates an HVAC case of the HVAC assembly of FIG. 1, the HVAC case including a fastener in accordance with the present teachings.

FIG. 1 illustrates a heating, ventilation, and air conditioning (HVAC) assembly at reference numeral 10. The HVAC assembly 10 can be configured for use in any suitable vehicle, such as any suitable passenger automobile, mass transit vehicle, utility vehicle, commercial vehicle, construction vehicle, watercraft, aircraft, military vehicle, etc. The HVAC assembly 10 can also be used in any suitable structure, such as any suitable building, to condition the air therein. The HVAC assembly 10 generally includes a blower unit 12 and an HVAC case 14, which are connected by an air exchange unit 16. With reference to FIG. 2, the HVAC case 14 includes a first portion 20 and a second portion 22, which are coupled together by a fastener 30 in accordance with the present teachings.

Figure 3A:
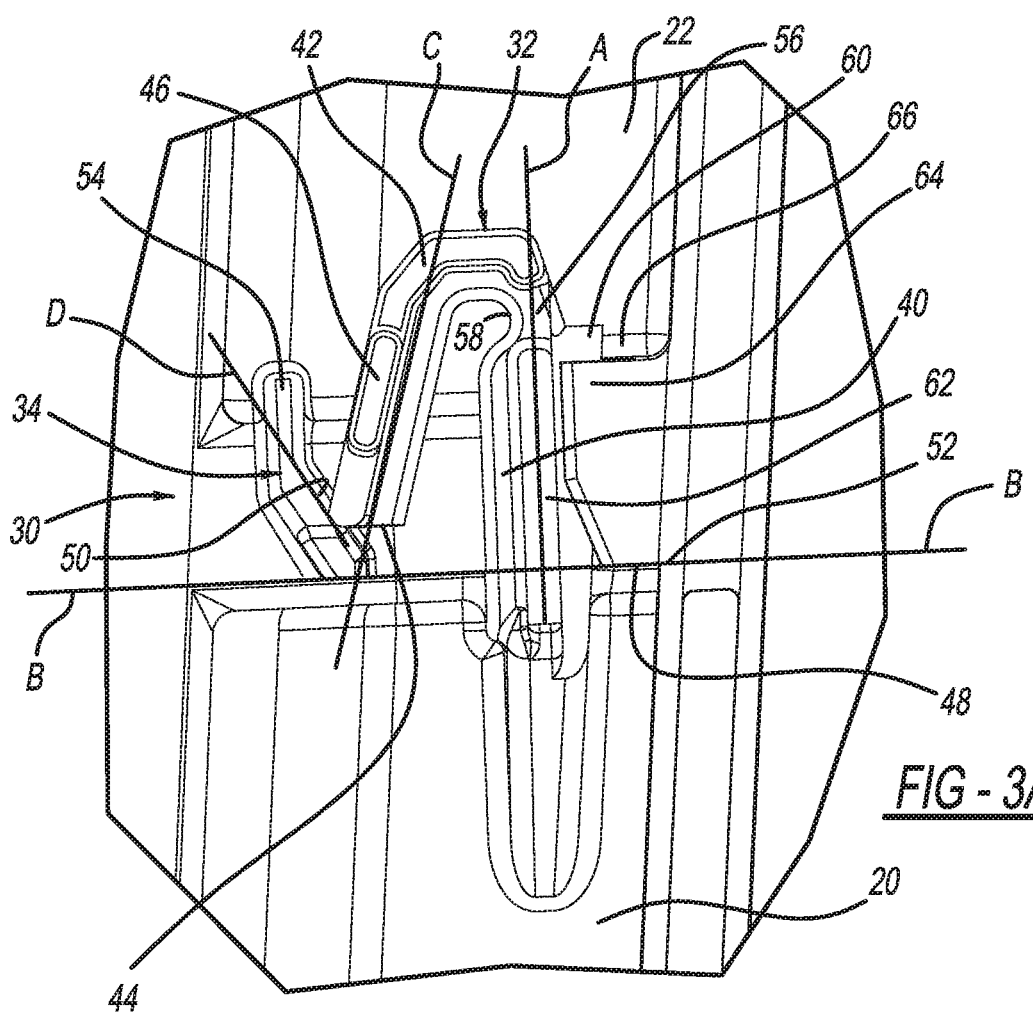
FIG. 3A illustrates area 3A of FIG. 2, which includes the fastener according to the present teachings.

FIG. 3A illustrates area 3A of FIG. 2, which includes the fastener 30. With reference to FIG. 3A and FIG. 4, the fastener 30 includes a clip 32 and a retention member or surface 34 configured to mate with the clip 32. The clip 32 is mounted to, or integral with, the first portion 20 of the case 14. The retention member/surface 34 is mounted to, or integral with, the second portion 22 of the case 14.

The clip 32 includes a post 40 and a spring arm 42 extending from the post 40. The spring arm 42 includes a distal end 44, which mates with the retention member/surface 34 when the fastener 30 is coupling the first and second portions 20 and 22 of the HVAC case 14 together, as is illustrated in FIGS. 3A and 4. The distal end 44 can be generally smooth as illustrated in FIGS. 3A and 4, or can include a roughened portion to facilitate cooperation with the retention member/surface 34 as explained herein.

Between the post 40 and the spring arm 42 is a flexible region 56. The flexible region 56 is thinner relative to both the post 40 and the spring arm 42, which allows the flexible region 56 to flex. The flexible region 56 includes a notched portion 58, which facilitates flexion of the flexible region 56. Flexion at the flexible region 56 allows the spring arm 42 to be compressed inward towards the post 40. In contrast to the flexible region 56, the spring arm 42 and the post 40 are generally rigid.

Figure 6B:
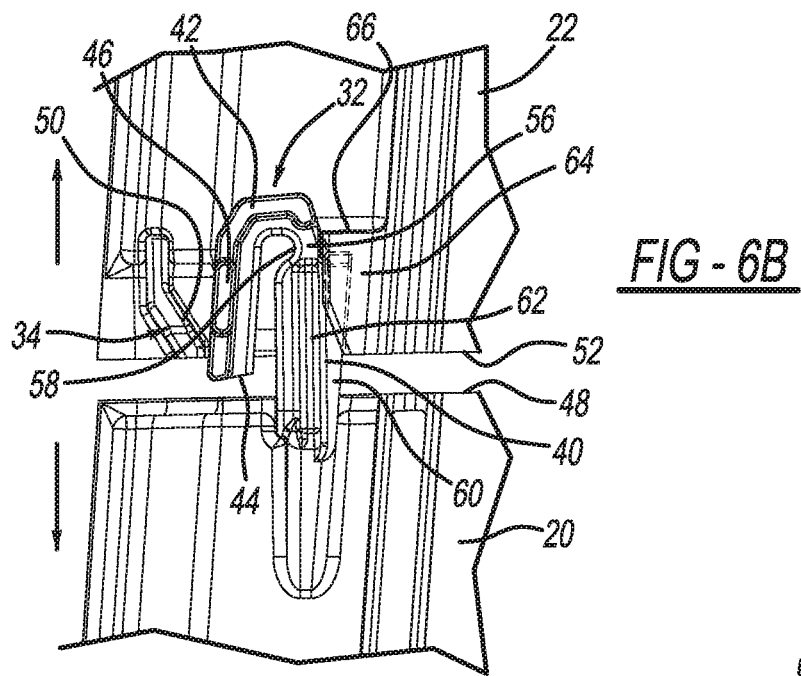
FIG. 6B illustrates the first and second portions of the HVAC case being decoupled.

The spring arm 42 includes a strengthening or release tab 46. The tab 46 advantageously provides added strength to the spring arm 42. Furthermore, the tab 46 can be depressed to move the spring arm 42 from the relaxed/expanded position of FIG. 3A to a compressed position, as illustrated in FIGS. 5B, 6A, and 6B. As explained further herein, in the compressed position the clip 32 can be moved into cooperation with the second portion 22 of the case 14, or be removed from cooperation with the second portion 22 of the case. The clip 32 can be made of any suitable material, such as any suitable polymeric or metallic material. At the flexible region 56, the clip 32 can be made of any suitable flexible material that biases the clip 32 in the relaxed/expanded position of FIGS. 3A and 4, and allows the spring arm 42 to flex inward towards the post 40. At the post 40 and the spring arm 42, the clip 32 can be made of any suitable rigid material, or generally rigid material.

The post 40 of the clip 32 extends from the first portion 20 of the case 14 beyond an edge 48 of the first portion 20 along axis A illustrated in FIG. 3A. The post 40 extends generally perpendicular to line B, which extends along the edge 48. The spring arm 42 extends from the post 40 back towards the edge 48, thus making the clip 32 generally U-shaped. The spring arm 42 extends along axis C, as illustrated in FIG. 3A. The spring arm 42 extends at an angle relative to the post 40, such as at an angle of less than 60° and greater than 0°. In the example illustrated, the spring arm 42 extends at an angle of 15° relative to the post 40, or about 15°. Therefore, lines A and C of FIG. 3A extend at an angle of 15°, or about 15°.

The retention member/surface 34 includes a contact surface 50 arranged to be in contact with the distal end 44 of the spring arm 42 when the fastener 30 is coupling the first and second portions 20 and 22 together, as illustrated in FIG. 3A. The contact surface 50 can be planar as illustrated, or have any suitable shape. For example, the contact surface 50 can include multiple planar portions extending at different angles relative to one another and/or include one or more curved portions. In the example illustrated, the contact surface 50 extends along line B at an angle relative to an edge 52 of the second portion 22 of less than 80° and greater than 0°. In the example of FIG. 3A, the contact surface 50 extends at an angle of 60° (or about 60°) relative to line B, which extends along the edge 52 of the second portion 22 (as well as along the edge 48 of the first portion 20). The contact surface 50 extends away from the edge 52 to a wall portion 54 of the retention member/surface 34. The wall portion 54 extends perpendicular to, or about perpendicular to, the edge 52 of the second portion 22, as well as line B extending along the edge 52.

The clip 32 further includes an alignment flange 60. The alignment flange 60 extends from the post 40, and has a length that extends generally parallel to the post 40 and the axis A. The alignment flange 60 extends from a side of the post 40 that is generally opposite to the spring arm. Also extending from the post 40 is an alignment rib 62. The alignment rib 62 extends along the length of the post 40 generally parallel to the axis A.

The second portion 22 of the case 14 includes an alignment tab 64, which defines an alignment slot 66. The alignment slot 66 is sized and shaped to receive the alignment flange 60 therein in order to guide the spring arm 42 into engagement with the contact surface 50 of the retention member/surface 34 when the clip 32 is brought into engagement with the second portion 22 to couple the first and second portions 20 and 22 of the HVAC case 14 together, as explained further herein. The alignment rib 62 abuts the alignment tab 64 to further guide the clip 32 into the proper position to secure the first and second portions 20 and 22 together.

Figure 3B:
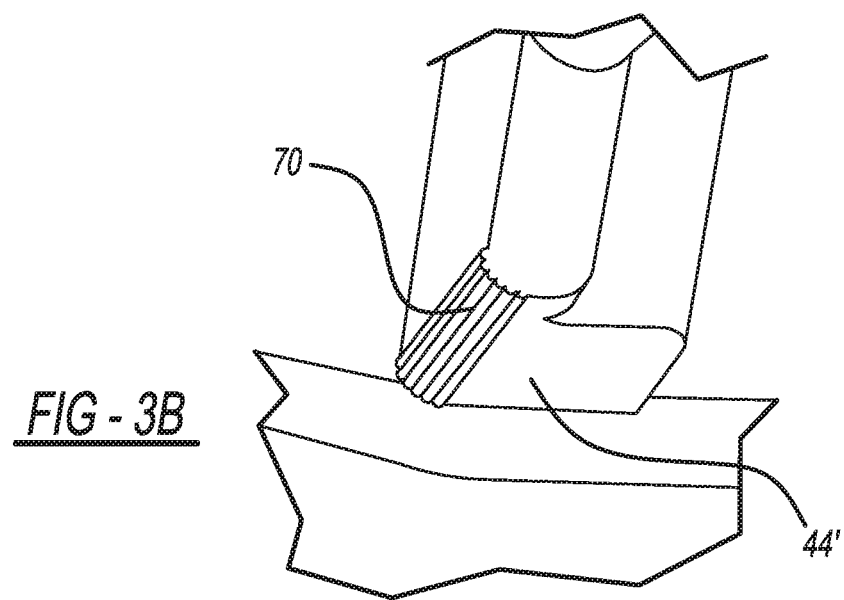
FIG. 3B illustrates a distal end of a clip of a fastener in accordance with the present teachings.

With reference to FIG. 3B, the spring arm 42 can be provided with a distal end 44' including a roughened portion 70. The roughened portion 70 can be provided in any suitable manner, such as by a roughened surface including ribs as illustrated, or any other suitable surface feature. The roughened portion 70 can be integral with the distal end 44', or a separate piece attached to the distal end 44', such as a tab or tip with a roughened surface. The roughened portion 70 facilitates cooperation between the distal end 44' and the contact surface 50 of the retention member/surface 34.

With additional reference to FIGS. 5A-5O, coupling of the first and second portions 20 and 22 of the HVAC case 14 together with the fastener 30 will now be described. The first and second portions 20 and 22 are pushed towards one another such that the alignment flange 60 of the clip 32 slides into the alignment slot 66, and the alignment rib 62 of the post 40 abuts the alignment tab 64. This positions the spring arm 42 at the retention member/surface 34. As illustrated in FIG. 5B, the spring arm 42 is moved from the relaxed/expanded position of FIG. 5A to the compressed position of FIG. 5B as a result of cooperation between the retention member/surface 34 and the spring arm 42, and/or as a result of a person depressing the spring arm 42 to the compressed position of FIG. 5B.

In the compressed position of FIG. 5B, the spring arm 42 is able to pass across the retention member/surface 34. After the distal end 44 of the spring arm 42 advances to a point such that the distal end 44 is in contact with the contact surface 50, the spring arm 42 is biased to expand back to the relaxed/expanded position, as illustrated in FIG. 5C. Because the spring arm 42 is biased to return to the relaxed/expanded position, the distal end 44 will move (i.e., ride) up the contact surface 50 away from the edge 52 of the second portion 22. As a result, the edge 48 of the first portion 20 is drawn into contact with the edge 52 of the second portion 22 to secure the first and second portions 20 and 22 together. Because the spring arm 42 is biased in the relaxed/expanded position of FIG. 5C, the distal end 44 will continue to advance upwards along the contact surface 50 away from the edge 52 until the edges 48 and 52 contact one another, which advantageously eliminates any need to modify or customize the clip 32 or the retention member/surface 34 in order to provide a secure coupling between the first and second portions 20 and 22. This advantageously provides the fastener 30 with a self-tuning configuration.

Figure 6C:
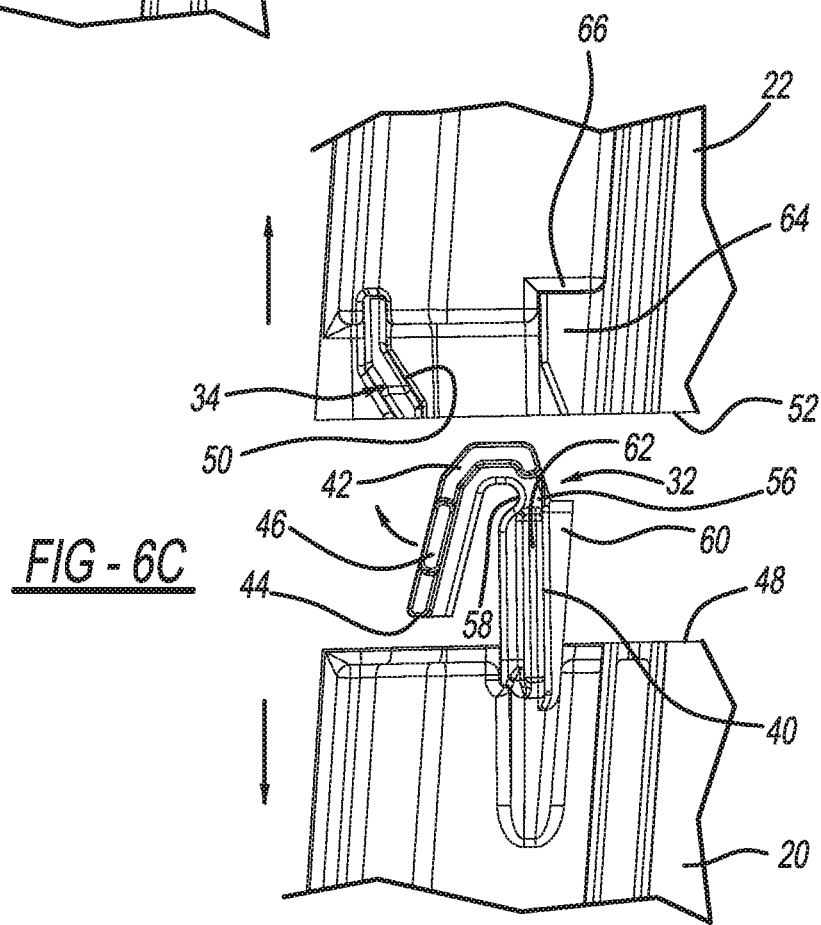
FIG. 6C illustrates the clip of the fastener returned to the relaxed/expanded position after the first and second portions of the HVAC case have been decoupled.

With reference to FIGS. 6A-6C, decoupling of the fastener 30 and the first and second portions 20 and 22 of the HVAC case 14 will now be described. As illustrated in FIG. 6A, the spring arm 42 is first depressed by a user in order to move the spring arm 42 from the relaxed/expanded position of FIG. 5C to the compressed position of FIG. 6A. The spring arm 42 can be moved to the compressed position by depressing the tab 46 of the spring arm 42, for example. The spring arm 42 is depressed until the distal end 44 moves away from the retention member/surface 34 a distance sufficient to allow the clip 32 to be pulled out from engagement with the contact surface 50, as illustrated in FIG. 6B for example. The first and second portions 20 and 22 are then pulled apart, as illustrated in FIG. 6C, in order to decouple the first and second portions 20 and 22 of the HVAC case 14.

The present teachings thus advantageously provide for a fastener 30 with a size and outer profile that is relatively smaller as compared to existing fasteners. For example and as illustrated in FIGS. 2 and 4, the clip 32, the retention member/surface 34, and the alignment tab 64 only slightly protrude outward from the HVAC case 14 as compared to existing fasteners. As a result, the HVAC case 14 can be installed in a small area. Another advantage of the fastener 30 is that the distal end 44 of the clip 32 can be seated at any suitable point along the contact surface 50, and the spring arm 42 is biased to draw the distal end 44 upward along the contact surface 50 as the spring arm 42 moves to its relaxed/expanded position in order to draw the first and second portions 20 and 22 together and provide a secure fit therebetween. This advantageously makes the fastener 30 a self-tuning fastener. One skilled in the art will recognize that the present teachings provide for numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) case for an HVAC assembly, the HVAC case comprising:
    a fastener for coupling a first portion of the HVAC case to a second portion of the HVAC case;
    a clip of the fastener included with the first portion of the HVAC case, the clip including a post and a spring arm extending at an angle of about 15° relative to the post, between the post and the spring arm is a flexible region that flexes to allow the spring arm to move inward towards the post and outward away from the post generally parallel to a first edge of the first portion; and
    a retention member of the fastener included with the second portion of the HVAC case, the retention member including a clip retention surface extending at an angle of about 60° relative to a second edge of the second portion that abuts the first edge of the first portion when the fastener is coupling the first portion and the second portion together;
    wherein the flexible region of the clip biases the spring arm to flex outward from the post against the clip retention surface of the retention member to retain the spring arm against the clip retention surface; and
    wherein cooperation between the spring arm of the clip and the clip retention surface of the retention member maintains the first portion of the HVAC case and the second portion of the HVAC case coupled together.

2. The HVAC case of claim 1, wherein the post extends from the first edge of the first portion perpendicular to the first edge.

3. The HVAC case of claim 1, wherein the spring arm extends from the post back towards the first edge of the first portion.

4. The HVAC case of claim 1, wherein the spring arm includes a roughened distal end configured to facilitate cooperation between the clip retention surface and the clip.

5. The HVAC case of claim 1, wherein:
    the clip further comprises an alignment flange extending from the post; and the second portion of the HVAC case defines an alignment slot configured to receive the alignment flange therein to align the clip against the retention member.

6. The HVAC case of claim 1, wherein the clip retention surface is planar.

7. A heating, ventilation, and air conditioning (HVAC) case for an HVAC assembly, the HVAC case comprising:
   a first portion of the HVAC case including a clip, the clip having a post and a spring arm extending at an angle of about 15° relative to the post, between the post and the spring arm is a flexible region that flexes to allow the spring arm to move inward towards the post and outward away from the post generally parallel to a first edge of the first portion; and
   a second portion of the HVAC case including an alignment tab defining an alignment slot, and a retention member including a clip retention surface extending at an angle of about 60° relative to a second edge of the second portion that abuts the first edge of the first portion when the clip is coupling the first portion and the second portion together;
   wherein the first and second portions are coupled together upon insertion of the post into the alignment slot to align the spring arm with the retention member;
   wherein the flexible region of the clip biases the spring arm to flex outward from the post against the clip retention surface of the retention member to retain the spring arm against the clip retention surface; and
   wherein cooperation between the spring arm of the clip and the clip retention surface of the retention member maintains the first portion of the HVAC case and the second portion of the HVAC case coupled together.

8. The HVAC case of claim 7, wherein an alignment flange of the post is inserted into the alignment slot.

9. The HVAC case of claim 7, wherein:
   the clip is movable from a relaxed position to a compressed position, in the compressed position the spring arm is depressed inward towards the post as compared to the relaxed position;
   the retention member and the alignment slot are spaced apart and the clip is arranged between the retention member and the alignment slot when the clip is coupled to the second portion; and
   the clip is configured such that for the spring arm to pass over the retention member as the first and second portions are coupled together, the clip must be moved to the compressed position.

10. The HVAC case of claim 9, wherein the clip is configured such that for the spring arm to pass over the retention member as the first and second portions are decoupled, the clip must be moved to the compressed position to permit the clip to be drawn out from cooperation with the second portion.

11. The HVAC case of claim 9, wherein a distal end of the spring arm contacts the clip retention surface when the clip is coupled to the second portion; and
   the distal end of the spring arm includes a roughened portion.

* * * * *

UNITED STATES PATENT AND TRADEMARK OFFICE
CERTIFICATE OF CORRECTION

PATENT NO. : 10,513,164 B2
APPLICATION NO. : 15/428587
DATED : December 24, 2019
INVENTOR(S) : Ross Perigo et al.

Page 1 of 1

It is certified that error appears in the above-identified patent and that said Letters Patent is hereby corrected as shown below:

On the Title Page

Column 1, (72) Inventors, Line 2: Delete "Pataskala (JP)" and insert --Pataskala, OH (US)-- therefor Signed and Sealed this
Twenty-fifth Day of February, 2020

Andrei Iancu
*Director of the United States Patent and Trademark Office*